United States Patent [19]

Mark et al.

[11] Patent Number: 4,487,896
[45] Date of Patent: Dec. 11, 1984

[54] COPOLYESTER-CARBONATE COMPOSITIONS EXHIBITING IMPROVED PROCESSABILITY

[75] Inventors: Victor Mark, Evansville; Charles V. Hedges, Mt. Vernon, both of Ind.

[73] Assignee: General Electric Company, Mt. Vernon, Ind.

[21] Appl. No.: 528,932

[22] Filed: Sep. 2, 1983

[51] Int. Cl.³ ............................................. C08G 63/64
[52] U.S. Cl. .................................. 525/439; 525/444; 525/448; 525/466; 525/469; 525/470; 528/125; 528/126; 528/128; 528/173; 528/176; 528/191; 528/193; 528/194
[58] Field of Search ............... 528/125, 126, 128, 173, 528/176, 191, 193, 194; 525/439, 444, 448, 466, 469, 470

[56] References Cited

U.S. PATENT DOCUMENTS 3,169,121 2/1965 Goldberg ............................ 528/194
3,207,814 9/1965 Goldberg ............................ 528/194
4,395,534 7/1983 Shimizu et al. ..................... 528/176

Primary Examiner—Lester L. Lee
Attorney, Agent, or Firm—Myron B. Kapustij; Martin B. Barancik

[57] ABSTRACT

Copolyester-carbonate resin compositions exhibiting improved processability comprised of (i) at least one copolyester-carbonate resin derived from (a) a carbonate precursor; (b) at least one difunctional carboxylic acid or a reactive derivative thereof; and (c) at least one dihydric phenol wherein the bridging divalent hydrocarbon group connecting the two aromatic residues is represented by the general formula

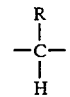

wherein R represents a straight chain alkyl radical containing from 1 to 5 carbon atoms.

22 Claims, No Drawings

COPOLYESTER-CARBONATE COMPOSITIONS EXHIBITING IMPROVED PROCESSABILITY

BACKGROUND OF THE INVENTION

Copolyester-carbonate resins are a class of thermoplastic resins that, due to their many excellent mechanical and physical properties, are finding increased use as engineering thermoplastic materials in many commercial and industrial applications. They are a member of the tough thermoplastic family and exhibit excellent properties of toughness, flexibility, impact resistance, heat distortion temperatures, optical clarity, and the like. These copolyester-carbonate resins may generally be prepared, as disclosed in U.S. Pat. No. 3,169,121, by the reaction of a carbonate precursor, a dihydric phenol, and a difunctional carboxylic acid. However, while possessing many advantageous mechanical and physical properties these copolyester-carbonate resins, due to their relatively high melt viscosities, are generally somewhat difficult to process.

It would thus be very advantageous if copolyester-carbonate resin compositions could be provided which while generally retaining, to a generally substantial degree, substantially generally most of their other advantageous properties were simultaneously easier to process. It would be particularly advantageous if copolyester-carbonate resin compositions could be provided which exhibited improved processability and also generally exhibited, to a generally substantial degree, generally relatively good heat distortion temperatures.

It is, therefore, an object of the instant invention to provide copolyester-carbonate resin compositions which exhibit improved processability and also generally exhibit, to a generally substantial degree, generally good mechanical and physical properties.

SUMMARY OF THE INVENTION

In accordance with the instant invention there are provided novel copolyester-carbonate resin compositions which generally exhibit, to a generally substantial degree, generally most of the other advantageous properties of copolyester-carbonate resin compositions while simultaneously exhibiting improved processability. These copolyester-carbonate resin compositions exhibit improved processability and also generally exhibit, to a generally substantial degree, generally relatively good heat distortion temperatures.

These novel copolyester-carbonate compositions contain at least one copolyester-carbonate resin which is comprised of the polymerized reaction products of (i) a carbonate precursor, (ii) at least one difunctional carboxylic acid or a reactive derivative thereof, and (iii) at least one particular dihydric phenol wherein the bridging group connecting the two aromatic nuclear residues is represented by the general formula

wherein R is a straight chain alkyl radical containing from 1 to 5 carbon atoms.

DESCRIPTION OF THE INVENTION

It has been discovered that copolyester-carbonate resins can be obtained which exhibit improved processability while at the same time generally retaining, to a generally substantial degree, substantially generally most of the other advantageous properties of copolyester-carbonate resins.

Briefly stated, the copolyester-carbonates of this invention comprise recurring carbonate groups

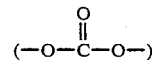

carboxylate groups

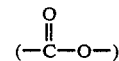

and aromatic carbocyclic groups in the linear polymer chain, in which at least some of the carboxylate groups and at least some of the carbonate groups are bonded directly to the ring carbon atoms of the aromatic carbocyclic groups.

These copolyester-carbonate polymers contain, as stated above, ester and carbonate bonds in the polymer chain. The amount of the ester bonds is from about 25 to about 90 mole percent, preferably from about 35 to about 80 mole percent, relative to the carbonate bonds. For example, 5 moles of bisphenol-A reacting completely with 4 moles of isophthaloyl dichloride and 1 mole of phosgene would give a copolyester-carbonate of 80 mole percent ester bonds.

The copolyester-carbonate resins of the instant invention are derived from (i) a carbonate precursor, (ii) at least one difunctional carboxylic acid, and (iii) at least one dihydric phenol selected from dihydric phenols wherein the bridging group joining the two aromatic nuclear residues is represented by the general formula

wherein R is a straight chain alkyl radical containing from 1 to 5 carbon atoms. More particularly, the dihydric phenols used in the preparation of the instant copolyester-carbonates may be represented by the general formula

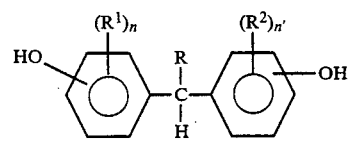

I.

wherein:

R is selected from straight chain alkyl radicals containing from 1 to 5 carbon atoms;

$R^1$ is independently selected from monovalent hydrocarbon radicals, monovalent hydrocarbonoxy radicals, and halogen radicals;

$R^2$ is independently selected from monovalent hydrocarbon radicals, monovalent hydrocarbonoxy radicals, and halogen radicals; and n and n' are independently selected from positive integers having a value of from 0 to 4 inclusive.

The monovalent hydrocarbon radicals represented by $R^1$ and $R^2$ are selected from alkyl radicals, cycloalkyl radicals, aryl radicals, alkaryl radicals, and aralkyl radicals.

Preferred alkyl radicals represented by $R^1$ and $R^2$ are those containing from 1 to about 8 carbon atoms. Some illustrative non-limiting examples of these preferred alkyl radicals include methyl, ethyl, propyl, isopropyl, butyl, tertiarybutyl, pentyl, and neopentyl.

Preferred cycloalkyl radicals represented by $R^1$ and $R^2$ are those containing from 4 to about 7 ring carbon atoms. Some illustrative non-limiting examples of these cycloalkyl radicals include cyclobutyl, cyclopentyl, cyclohexyl, methylcyclohexyl, and cycloheptyl.

Preferred aryl radicals represented by $R^1$ and $R^2$ are those containing from 6 to 12 carbon atoms. These include phenyl, naphthyl and biphenyl.

Preferred aralkyl and alkaryl radicals represented by $R^1$ and $R^2$ are those containing from 7 to about 12 carbon atoms. Some illustrative non-limiting examples of these aralkyl and alkaryl radicals include ethylphenyl, propylphenyl, benzyl, methylnaphthyl, and the like.

The preferred halogen radicals are chlorine and bromine.

The monovalent hydrocarbonoxy radicals represented by $R^1$ and $R^2$ are represented by the general formula $-OR^3$ wherein $R^3$ represents a monovalent hydrocarbon radical of the type defined hereinafore.

In the dihydric phenol compounds of Formula I when more than one $R^1$ substituent is present they may be the same or different. The same is true for the $R^2$ substituent. The positions of the hydroxyl groups and $R^1$ or $R^2$ on the aromatic nuclear residue may be varied in the ortho, meta or para positions and the groupings can be in a vicinal, asymmetrical or symmetrical relationship where two or more ring carbon atoms of the aromatic nuclear residue are substituted with $R^1$ or $R^2$ and hydroxyl groups.

Particularly useful dihydric phenols of Formula I are those wherein $R^1$ and $R^2$ are selected from monovalent hydrocarbon radicals, with alkyl radicals being the preferred monovalent hydrocarbon radicals.

Preferred dihydric phenols of Formula I are the 4,4'-bisphenols.

It is critical to the present invention that R is a straight chain alkyl radical containing from 1 to 5 carbon atoms. If R is a straight chain alkyl radical containing more than 5 carbon atoms the processability of the resultant copolyester-carbonate resins will be improved, but only at the expense of their heat distortion temperatures. That is to say, if R is a straight chain alkyl group containing more than 5 carbon atoms the heat distortion temperatures of t he resultant copolyester-carbonate resins will begin to be significantly adversely affected. If, on the other hand, R is a branched alkyl radical containing 5 or less carbon atoms there will not be as significant an improvement in the processability of the resultant copolyester-carbonate resins as in the case where R is a straight chain alkyl radical containing from 1 to 5 carbon atoms.

Some illustrative non-limiting examples of the dihydric phenols of Formula I include
1,1-bis(4-hydroxyphenyl)ethane;
1,1-bis(4-hydroxyphenyl)propane;
1,1-bis(4-hydroxyphenyl)butane;
1,1-bis(3,5-dimethyl-4-hydroxyphenyl)ethane;
1,1-bis(3-chloro-4-hydroxyphenyl)propane; and
1,1-bis(3-chloro-4-hydroxyphenyl)butane.

The carbonate precursor can be a carbonyl halide, a diarylcarbonate, or a bishaloformate. The carbonyl halides include carbonyl bromide, carbonyl chloride, and mixtures thereof. The bishaloformates include the bishaloformates of dihydric phenols such as bischloroformates of 2,2-bis(4-hydroxyphenyl)propane, hydroquinone, and the like; or the bischloroformates of glycols such as the bischloroformates of ethylene glycol, neopentyl glycol, polyethylene glycol, and the like. Typical of the diarylcarbonates which may be employed are diphenyl carbonate, and the di(alkylphenyl)carbonates such as di(tolyl)carbonate. Some other non-limiting illustrative examples of suitable diarylcarbonates include di(naphthyl)carbonate, phenyl tolyl carbonate, and the like.

The preferred carbonate precursors are the carbonyl halides, with carbonyl chloride, also known as phosgene, being the preferred carbonyl halide.

In general, any difunctional carboxylic acid conventionally used in the preparation of linear polyesters may be utilized in the preparation of the copolyester-carbonate resins of the instant invention. Generally, the carboxylic acids which may be utilized include the aliphatic carboxylic acids, the aromatic carboxylic acids, and the aliphatic-aromatic carboxylic acids. These acids are disclosed in U.S. Pat. No. 3,169,121, which is hereby incorporated herein by reference.

The difunctional carboxylic acids which may be used generally will conform to the general formula $$R^4-(R^5)_q-COOH \qquad (II)$$

wherein $R^5$ is an alkylene, alkylidene, or cycloaliphatic group; an alkylene, alkylidene or cycloaliphatic group containing ethylenic unsaturation; an aromatic group such as phenylene, biphenylene, substituted phenylene, and the like; two or more aromatic groups connected through non-aromatic linkages such as alkylene or alkylidene groups; and a divalent aralkyl radical such as tolylene, xylylene, and the like. $R^4$ is either a carboxyl or a hydroxyl group. The letter q represents one where $R^4$ is a hydroxyl group and either zero or one where $R^4$ is a carboxyl group.

Preferred difunctional carboxylic acids are the aromatic dicarboxylic acids. Particularly useful aromatic dicarboxylic acids are those represented by the general formula

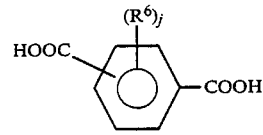

III.

wherein j is a positive integer having a value of from 0 to 4 inclusive; and $R^6$ is independently selected from alkyl radicals, preferably lower alkyl radicals containing from 1 to about 5 carbon atoms.

Mixtures of these difunctional carboxylic acids may be employed as well as single acids. Therefore, where the term difunctional carboxylic acid is used herein it is to be understood that this term includes mixtures of two or more different difunctional carboxylic acids as well as individual carboxylic acids. The same holds true for the dihydric phenols of Formula I.

Preferred aromatic dicarboxylic acids are isophthalic acid, terephthalic acid, and mixtures thereof. A particularly useful carboxylic acid comprises a mixture of isophthalic acid and terephthalic acid wherein the weight ratio of terephthalic acid to isophthalic acid is in the range of from about 1:10 to about 0.2:9.8.

Rather than utilizing the difunctional carboxylic acid per se, it is possible, and sometimes even preferred, to employ the reactive derivatives of said acid. Illustrative of these reactive derivatives are the acid halides. The preferred acid halides are the acid dichlorides and the acid dibromides. Thus, for example, instead of using isophthalic acid, terephthalic acid, or mixtures thereof, it is possible to employ isophthaloyl dichloride, terephthaloyl dichloride, and mixtures thereof.

The copolyester-carbonates of the instant invention may be prepared by known processes such as interfacial polymerization or phase boundary separation, transesterification, solution polymerization, melt polymerization, interesterification, and the like. Various prior art polymerization processes are disclosed in U.S. Pat. Nos. 3,030,331; 3,169,121; 3,027,814 and 4,188,314, all of which are hereby incorporated herein by reference. Although the processes may vary, several of the preferred processes typically involve dissolving or dispersing the reactants in a suitable water immiscible solvent medium and contacting the reactants with a carbonate precursor, such as phosgene, in the presence of a suitable catalyst and an aqueous caustic solution under controlled pH conditions. A molecular weight regulator, that is a chain stopper, is generally added to the reactants prior to or during contacting them with a carbonate precursor. Useful molecular weight regulators include, but are not limited to, monohydric phenols such as phenol, chroman-I, paratertiarybutylphenol, and the like. Techniques for the control of molecular weight are well known in the art and may be used in the present process for controlling the molecular weight of the copolyester-carbonate resins. The most commonly used water immiscible solvents include methylene chloride, 1,2-dichloroethane, chlorobenzene, toluene, and the like.

The catalysts which can be employed, if an interfacial polymerization technique is used, accelerate the rate of polymerization of the dihydric phenol of Formula I with the ester precursor such as the diacid halide or the carboxylic acid and with the carbonate precursor such as phosgene. Suitable catalysts include but are not limited to tertiary amines such as triethylamine, quaternary phosphonium compounds, quaternary ammonium compounds, and the like.

Also included within the scope of the instant invention are the randomly branched copolyester-carbonate resins wherein a minor amount (typically between 0.05 and 2 mol percent, based on the quantity of dihydric phenol used) of a polyfunctional aromatic compound is a co-reactant with the dihydric phenol of Formula I in the reaction mixture, comprising also the carbonate precursor and the ester precursor, to provide a thermoplastic randomly branched copolyester-carbonate. These polyfunctional aromatic compounds contain at least three functional groups which may be hydroxyl, carboxyl, carboxylic anhydride, haloformyl, or mixtures thereof. Some illustrative non-limiting examples of these polyfunctional compounds include trimellitic anhydride, trimellitic acid, trimellityl trichloride, 4-chloroformyl, phthalic anhydride, pyromellitic acid, pyromellitic dianhydride, mellitic acid, mellitic anhydride, trimesic acid, benzophenonetetracarboxylic acid, benzophenonetetracarboxylic acid anhydride, and the like. Other organic polyfunctional compounds useful in making these randomly branched copolyester-carbonates are disclosed in U.S. Pat. Nos. 3,635,895 and 4,001,184, both of which are incorporated herein by reference.

When a dicarboxylic acid or its reactive derivative is used as the ester precursor in the instant invention the instant copolyester-carbonates will generally contain repeating structural units represented by the general formulae

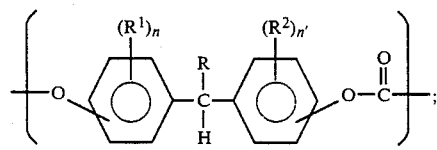

and

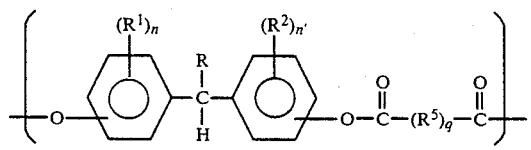

wherein R, R$^1$, R$^2$, R$^5$, q, n and n' are as defined hereinafore.

The high molecular weight aromatic copolyester-carbonate resins of the instant invention generally have a weight average molecular weight in the range of from about 5,000 to about 200,000, preferably in the range of from about 10,000 to about 100,000, and more preferably in the range of from about 20,000 to about 60,000.

Another embodiment of the instant invention is a copolyester-carbonate resin which is derived from (i) a carbonate precursor, (ii) at least one difunctional carboxylic acid or its reactive derivative, (iii) at least one dihydric phenol of Formula I, (iv) and at least one conventional dihydric phenol.

The conventional dihydric phenol utilized in this embodiment may be represented by the general formula

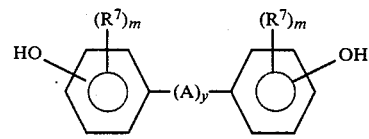

wherein:

R$^7$ is independently selected from monovalent hydrocarbon radicals, halogen radicals, and monovalent hydrocarbonoxy radicals of the type described hereinafore;

m is independently selected from positive integers having a value of from 0 to 4 inclusive, y is either 0 or 1; and A is a divalent radical selected from divalent hydrocarbon radicals,

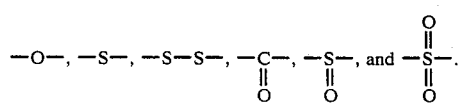

The divalent hydrocarbon radicals represented by A are selected from alkylene radicals, cycloalkylene radicals, alkylidene radicals, and cycloalkylidene radicals.

The dihydric phenols of Formula VI are well known to those skilled in the art. Some illustrative nonlimiting examples of these dihydric phenols include:
2,2-bis(4-hydroxyphenyl)propane (bisphenol-A);
1,3-bis(3-methyl-4-hydroxyphenyl)propane;
2,2-bis(3-phenyl-4-hydroxyphenyl)propane;
2,2-bis(4-hydroxyphenyl)pentane;
1,1-bis(4-hydroxyphenyl)cyclohexane;
4,4'-dihydroxydiphenyl;
4,4'-thiodiphenol;
2,2-bis(3,5-diethyl-4-hydroxyphenyl)propane;
2,2-bis(2-methoxy-3,5-dimethyl-4-hydroxyphenyl)propane;
p,p'dihydroxydiphenyl ether; and
1,2-bis(4-hydroxyphenyl)ethane.

In this embodiment the amount of the dihydric phenol of Formula I used is an amount effective to improve the processability of the copolyester-carbonate resins. Generally, this amount is at least about 5 weight percent, based on the total amounts of the dihydric phenols of Formulae I and VI used. Generally, if less than about 5 weight percent of the dihydric phenol of Formula I is employed there will be no appreciable improvement in the processability of the resultant copolyester-carbonate resin. The upper limit of the amount of the dihydric phenol of Formula I that may be used is not critical. Thus, the upper limit may range up to about 99 weight percent of the dihydric phenol of Formula I and about 1 weight percent of the dihydric phenol of Formula VI, based on the total amounts of the dihydric phenols of Formulae I and VI used.

Particularly useful copolyester-carbonate resins are those which are derived from about 10 to about 70 weight percent of at least one dihydric phenol of Formula I and from about 30 to about 90 weight percent of at least one dihydric phenol of Formula VI, based on the total amounts of dihydric phenols of Formulae I and VI used.

The copolyester-carbonate resins of this embodiment will generally contain repeating structural units represented by the following general formulae: IV, V,

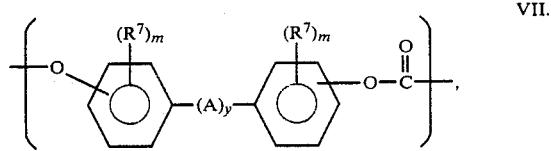

VII.

and

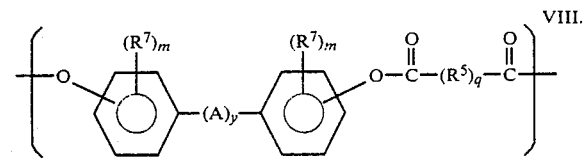

VIII.

wherein $R^7$, m, $R^5$, y, q, and A are as defined hereinafore.

The amounts of structural units of Formulae IV and V present will depend upon the amounts of the dihydric phenol of Formula I utilized, while the amounts of the structural units of Formulae VII and VIII present will depend upon the amounts of the dihydric phenol of Formula VI used.

Still another embodiment of the instant invention is a copolyester-carbonate blend comprised of (i) at least one copolyester-carbonate resin derived from (a) a carbonate precursor, (b) at least one difunctional carboxylic acid or a reactive derivative thereof, and (c) at least one dihydric phenol of Formula I (hereinafter referred to as resin A); and (ii) at least one conventional prior art copolyester-carbonate resin derived from (a) a carbonate precursor, (b) at least one difunctional carboxylic acid or a reactive derivative thereof, and (c) at least one dihydric phenol of Formula VI (hereinafter referred to as resin B).

The amount of resin A present in these blends is an amount effective to improve the processability of these blends. Generally, this amount is at least about 5 weight percent, based on the total amounts of resins A and B present in the blends. Generally, if less than about 5 weight percent of resin A is present in these blends there will be no significant improvement in the processability of these blends. The upper amount of resin A which is present in these blends is not critical. Thus, these blends may contain up to about 99 weight percent or resin A and about 1 weight percent of resin B, based upon the total amounts of resins A and B present in these blends.

Particularly useful blends are those which contain from about 10 to about 70 weight percent of resin A and from about 30 to about 90 weight percent of resin B, based on the total amounts of resins A and B present in these blends.

The compositions of the instant invention may optionally contain various commonly known and used additives such as, for example, antioxidants; antistatic agents; inert fillers such as glass, talc, mica, and clay; ultraviolet radiation absorbers such as the benzophenones, benzotriazoles, and the like; hydrolytic stabilizers such as the epoxides disclosed in U.S. Pat. Nos. 3,489,716, 4,138,379, and 3,839,247, all of which are incorporated herein by reference; color stabilizers such as the organophosphites; flame retardants; and mold release agents.

Some particularly useful flame retardants are the alkali and alkaline earth metal salts of sulfonic acids. These types of flame retardants are disclosed in U.S. Pat. Nos. 3,933,734; 3,931,100; 3,978,024; 3,948,851; 3,926,908; 3,919,167; 3,909,490; 3,953,396; 3,953,399; 3,917,559; 3,951,910 and 3,940,366, all of which are hereby incorporated herein by reference.

DESCRIPTION OF THE PREFERRED EMBODIMENT

The following examples are set forth to further illustrate the present invention and are not to be construed as limiting the invention thereto. These examples are set forth by way of illustration and not limitation. Unless otherwise specified, all parts and percentages are percentages or parts by weight.

The following examples illustrate copolyester-carbonate resins falling outside the scope of the instant invention. These examples are presented for comparative purposes only.

EXAMPLE 1

This example illustrates the preparation of a prior art conventional copolyester-carbonate resin derived from bisphenol-A and isophthaloyl dichloride.

To a 2 liter reaction vessel there are added 34.2 grams (0.15 mole) of bisphenol-A, 0.30 gram (2.1 mole %) of phenol, 0.42 milliliter of triethylamine, 400 milliliters of methylene chloride and 300 milliliters of water. A 25% aqueous solution of sodium hydroxide is added to adjust the pH of the reaction mixture to 11 and thereafter to maintain it at pH 11. Isophthaloyl dichloride, 15.2 grams (0.075 mole), dissolved in 20 grams of methylene chloride is added dropwise to the reaction mixture over a period of 5 minutes while maintaining the pH at about 11 with the use of an automatic titrator. After the pH becomes stable, without the use of additional caustic solution, phosgene is introduced at the rate of 0.5 gram per minute for 26 minutes while maintaining the pH at about 11 by the addition of the aqueous caustic solution. The amount of phosgene added is 13 grams (0.133 mole). The methylene chloride layer is separated from the alkaline aqueous layer, washed with 0.01N aqueous hydrochloric acid, and is then washed twice with deionized water. The copolyester-carbonate resin is precipitated with methanol and dried in a vacuum oven at 60° C.

The intrinsic viscosity of the resultant polymer is found to be 0.615 dl/gm at 25° C. in methylene chloride.

The Kasha Index (KI) of this copolyester-carbonate is determined. The Kasha Index is an indication or measure of the processability of the resin. The lower the KI the greater the melt flow rate and, therefore, the better the processability of the resin. Basically, the Kasha Index is a measurement of the melt viscosity of the resin. The procedure for determining the Kasha Index as follows: 7 grams of resin pellets, dried a minimum of 90 minutes at 125° C. are added to a modified Tinius-Olsen model T-3 melt indexer; the temperature in the indexer is maintained at 300° C. and the resin is heated at this temperature for 6 minutes; after 6 minutes the resin is forced through a 0.04125 inch radius orifice using a plunger of radius of 0.1865 inch and an applied force of 17.7 pounds; the time required for the plunger to travel 2 inches is measured in centiseconds and this is reported as the KI. The higher the KI the higher the melt viscosity and the more viscous the resin, and, therefore, the more difficult to process. The results of this test are set forth in Table I.

In order to determine the heat distortion temperatures of the copolyester-carbonate resin the glass transition temperature (Tg) of the resin is determined. As is well known to those skilled in the art the glass transition temperatures (Tg) can be used in place of het distortion temperatures since heat distortion temperatures are relatable to glass transition temperatures. Accordingly, glass transition temperatures have been measured to show resistance to high heat distortion of the copolyester-carbonate resins of the present invention. The glass transition temperatures are determined by using a Perkin-Elmer DSC-2B instrument which measures the second order glass transition temperature or Tg by differential scanning calorimetry. The results of these tests are set forth in Table I.

EXAMPLE 2

This example illustrates the preparation of a copolyester-carbonate resin falling outside the scope of the instant invention in that the dihydric phenol utilized is a 1,1-bis(4-hydroxyphenyl)dodecane, i.e. R in Formula I is the undecyl radical.

To a reactor vessel there are added 400 milliliters of methylene chloride, 300 milliliters of water, 35.5 grams of 1,1-bis(4-hydroxyphenyl)dodecane, 0.24 gram of phenol, and 0.28 milliliter of triethylamine. At a pH of about 11 10.2 grams of isophthaloyl dichloride dissolved in methylene chloride are added over a 15 minute period, while maintaining the pH at about 11 by the addition of a 25% aqueous sodium hydroxide solution. After the addition of the isophthaloyl dichloride is completed 6 grams of phosgene are introduced over a 15 minute period while maintaining the pH at about 11 by the addition of the aqueous caustic solution. The polymer mixture is diluted with methylene chloride and the brine phase is separated. The resulting polymer containing phase is washed with HCl(0.01N) and then with two water washing. The polymer is then recovered by steam precipitation. The resultant copolyester-carbonate resin is found to have an intrinsic viscosity at 25° C. in methylene chloride of 0.599 dl/gm.

The Tg of this resin is determined and the results are set forth in Table I.

The following example illustrates the preparation of a copolyester-carbonate resin of the instant invention.

EXAMPLE 3

This example illustrates the preparation of a copolyester-carbonate resin derived from isophthaloyl dichloride and 1,1-bis(4-hydroxyphenyl)ethane.

The procedure of Example 1 is substantially repeated except that the 34.2 grams of bisphenol-A are replaced with 32.1 grams (0.15 mole) of 1,1-bis(4-hydroxyphenyl)ethane.

The KI and the Tg of the resultant copolyester-carbonate resin are determined and the results are set forth in Table I.

TABLE I

| Example No. | Tg | KI |
|---|---|---|
| 1 | 170.6° C. | 24,620 |
| 2 | 53.1° C. | — |
| 3 | 154.5° C. | 18,840 |

As illustrated by the data in Table I the copolyester-carbonate resins of the instant invention, Example 3, exhibit greatly improved processability as indicated by the much lower KI than the prior art conventional copolyester-carbonates of Example 1. This improvement in processability is obtained without a substantially significant deterioration in the Tg of the resin. On the other hand a copolyester-carbonate resin wherein the R in Formula I is an alkyl containing substantially more carbon atoms than the 5 carbon atoms specified for the instant dihydric phenols, i.e. the 11 carbon atoms of Example 2, shows a severe deterioration of the Tg.

It will thus be seen that the objects set forth above, among those made apparent from the preceding description are efficiently attained, and since certain changes may be made in carrying out the above processes and compositions set forth without departing from the scope of the invention, it is intended that all matters contained in the above description shall be interpreted as illustrative and not in a limiting sense.

What is claimed is:

1. Copolyester-carbonate resin composition exhibiting improved processability comprised of (i) at least one copolyester-carbonate resin prepared by reacting
   (a) a carbonate precursor;
   (b) at least one difunctional carboxylic acid or a reactive derivative thereof; and (c) at least one dihydric phenol represented by the general formula

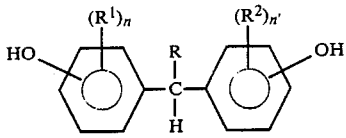

wherein:
R is selected from straight chain alkyl radicals containing from 1 to 5 carbon atoms,
$R^1$ is independently selected from the group consisting of aryl radicals, alkaryl radicals, halogen radicals, and monovalent hydrocarbonoxy radicals,
$R^2$ is independently selected from the group consisting of aryl radicals, alkaryl radicals, halogen radicals, and monovalent hydrocarbonoxy radicals, and
n and n' are independently selected from positive integers having a value of from 0 to 4 inclusive.

2. The composition of claim 1 wherein said halogen radicals are selected from chlorine and bromine.

3. The composition of claim 1 wherein said hydrocarbonoxy radicals are represented by the general formula —$OR^3$ wherein $R^3$ is selected from the group consisting of monovalent hydrocarbon radicals.

4. The composition of claim 1 wherein n and n' are both zero.

5. The composition of claim 1 wherein said difunctional carboxylic acid is an aromatic dicarboxylic acid.

6. The composition of claim 5 wherein said aromatic dicarboxylic acids are selected from the group consisting of isophthalic acid, terephthalic acid, and mixtures thereof.

7. The composition of claim 6 wherein said reactive derivatives of said aromatic dicarboxylic acid are selected from the group consisting of isophthaloyl dichloride, terephthaloyl dichloride, and mixtures thereof.

8. The composition of claim 7 wherein said carbonate precursor is phosgene.

9. The composition of claim 1 wherein said copolyester-carbonate resin (i) is prepared by reacting (a), (b), (c) and (d) at least one dihydric phenol represented by the general formula

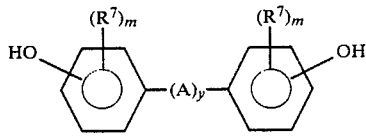

wherein:
$R^7$ is independently selected from the group consisting of monovalent hydrocarbon radicals, halogen radicals, and monovalent hydrocarbonoxy radicals;
y is either 0 or 1;
m is independently selected from positive integers having a value of from 0 to 4 inclusive; and
A is a divalent radical selected from the group consisting of divalent hydrocarbon radicals,

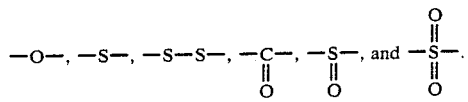

10. The composition of claim 9 which contain an amount of dihydric phenol (c) effective to improve the processability thereof.

11. The composition of claim 10 wherein said amount is at least about 5 weight percent of dihydric phenol (c) based on the total amounts of dihydric phenols (c) and (d) present.

12. The composition of claim 11 wherein said monovalent hydrocarbon radicals are selected from alkyl, cycloalkyl, aryl, aralkyl and alkaryl radicals.

13. The composition of claim 12 wherein said monovalent hydrocarbon radicals are selected from alkyl radicals.

14. The composition of claim 11 wherein said divalent hydrocarbon radicals are selected from the group consisting of alkylene, cycloalkylene, alkylidene and cycloalkylidene radicals.

15. The composition of claim 14 wherein said dihydric phenol (d) is bisphenol-A.

16. The composition of claim 1 which further contain (ii) at least one copolyester-carbonate resin prepared by reacting (e) a carbonate precursor, (f) at least one difunctional carboxylic acid or a reactive derivative thereof, and (g) at least one dihydric phenol represented by the general formula

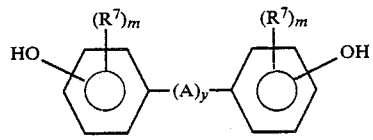

wherein:
$R^7$ is independently selected from the group consisting of monovalent hydrocarbon radicals, halogen radicals, and monovalent hydrocarbonoxy radicals;
y is either 0 or 1;
m is independently selected from positive integers having a value of from 0 to 4 inclusive; and
A is a divalent radical selected from the group consisting of divalent hydrocarbon radicals,

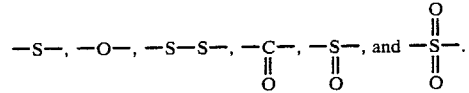

17. The composition of claim 16 which contain an amount of copolyester-carbonate resin (i) effective to improve the processability thereof.

18. The composition of claim 17 wherein said amount is at least about 5 weight percent resin (i), based on the total amounts of resins (i) and (ii) present.

19. The composition of claim 18 wherein said divalent hydrocarbon radicals are selected from the group consisting of alkylene, cycloalkylene, alkylidene, and cycloalkylidene radicals.

20. The composition of claim 19 wherein said monovalent hydrocarbon radicals are selected from the group consisting of alkyl, cycloalkyl, aryl aralkyl and alkaryl radicals.

21. The composition of claim 20 wherein said monovalent hydrocarbon radicals are selected from alkyl radicals.

22. The composition of claim 19 wherein said dihydric phenol is bisphenol-A.

* * * * *